Patented Apr. 6, 1937

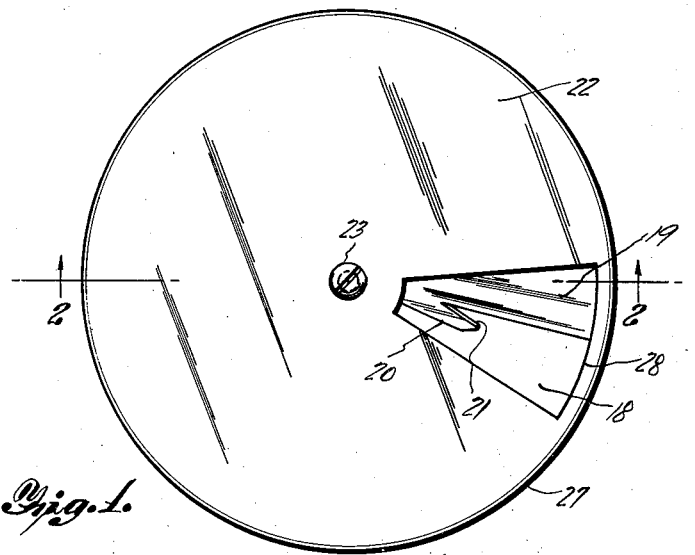
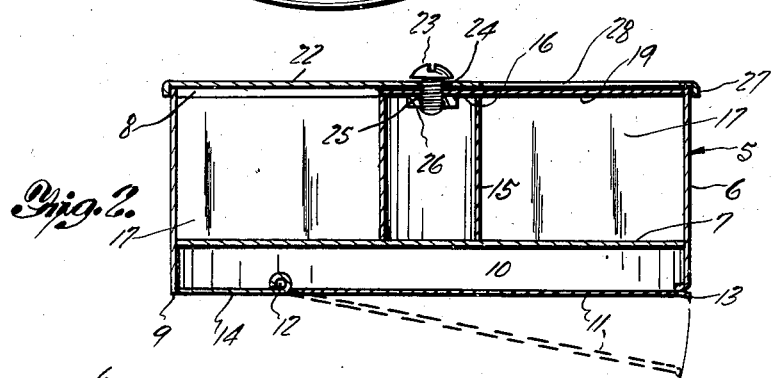
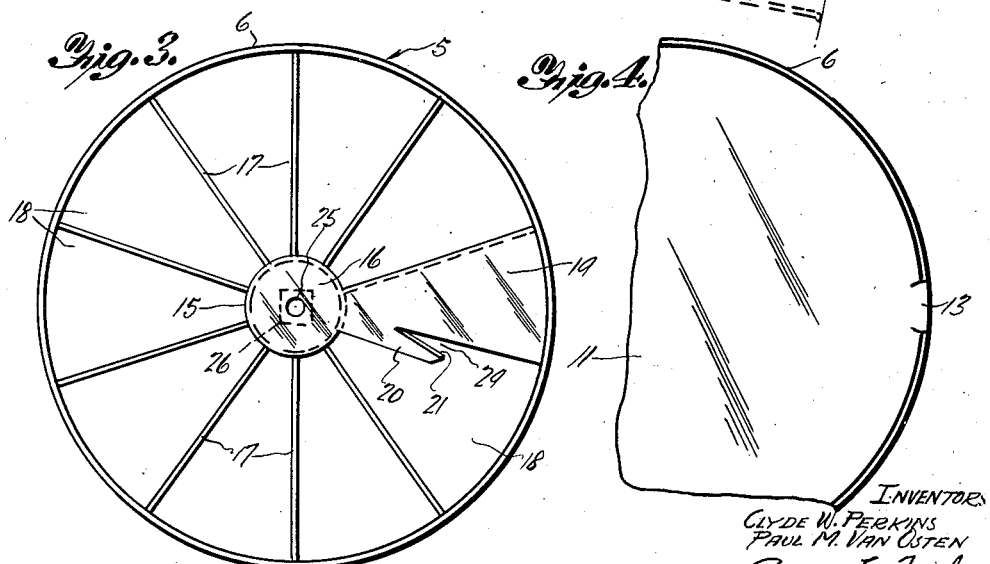

2,076,157

UNITED STATES PATENT OFFICE 2,076,157

FISHERMAN'S FLY BOX

Clyde W. Perkins and Paul M. Van Osten, Parkdale, Oreg.

Application April 8, 1936, Serial No. 73,198

3 Claims. (Cl. 43—32)

Our invention relates to improvements in fishermen's fly boxes.

The main object of our invention is to provide a fly box particularly for eyed flies which has a number of advantages in that it may be made large and roomy enough to carry an ample supply and assortment of flies yet is of small size and convenient circular shape to fit the pocket in any position, which has a transparent cover to show the assortment of flies, has a cover so arranged that, even when open, only one compartment of the flies is exposed and free to lose its contents should the box be dropped and which has a cutter by which flies may be readily cut off from the leader. The box may also have a conveniently arranged receptacle for leaders if so desired.

Another object is to provide a device of this kind of simple, inexpensive and durable form.

With these and other objects in view the invention resides in the novel construction and arrangement of parts as hereinafter fully set forth and claimed, reference being had to the accompanying drawing as showing a preferred embodiment of our invention for purposes of exemplification.

In the drawing:

Figure 1 is a plan view of the fly box showing the cover opened to the cutter for cutting off the flies from the leader.

Figure 2 is a cross section along the line 2—2 in Figure 1.

Figure 3 is a plan view with the cover removed.

Figure 4 is a fragmental inverted plan view showing the cover for the leader compartment.

In carrying out our invention we provide a circular box 5 including an annular side wall 6 and a circular bottom 7 affixed thereto, the top 8 being open. This bottom 7 may be set up from the lower edge 9 of the wall 6 so as to form a compartment 10 for carrying coiled leaders (not shown) this compartment being normally closed by a door or cover 11 having a spring hinge at 12 to hold it closed and with an outset catch 13 to facilitate the opening of the door by the finger. The segmental portion 14 of the lower closure is made fast to the side 6 to act as a hinge support for the door 11. If desired this compartment 10 may be eliminated simply by stopping side 6 at the lower margin of the bottom 7 and such change is considered within the scope of this invention.

A smaller circular inner wall 15 is mounted concentrically within the wall 6 on the bottom 7 and has a bearing plate or closure 16 at its top falling at a level flush with the upper margin of said outer wall 6. This wall 15 forms a "hub" or central support and bearing for the cover to be described and a plurality of radially extended dividing arms, walls or partitions 17 are radially extended and radiate in yoke-like assembly from the wall 15 to the wall 6. These partitions 17 are secured in any suitable manner to the walls and the bottom 7 and divide the annular space between the walls into a number of equal and separate compartments, cells or pockets designated generally at 18. One compartment 18 is covered by a cutter plate 19 preferably, though not necessarily formed integral with the bearing plate 16 and extending flush therewith out to the outer wall 6 and having a cutting blade 20 extended in an outward direction and obliquely from one margin out over an adjacent compartment. The inner edge of this blade 20 is sharpened as at 21.

A flat circular cover 22 is provided and same is of such diameter that it will fit nicely over the box 5 to which it is journaled and rotatably mounted by a screw 23 which passes through a central opening 24 in the cover, through a registering opening 25 in the bearing plate 16 and is screwed into a nut or like element 26 which is soldered or otherwise secured beneath said plate 16. Obviously the plate 16 might have its screw opening 25 tapped out to receive the screw if so desired. The cover 22 may thus be rotated on the box 5 and the cover has a downwardly turned peripheral flange 27 which overlies the wall 6 as a further guide for the cover. The cover has an opening 28 of outwardly widening shape thus similar in shape and size to the compartments 18 beneath.

In use the compartments 18 may be filled with flies (not shown) of different kinds and sizes and then by turning the cover 22 around any compartment may be opened and exposed for removal of flies through the opening 28. By turning the cover until the opening 28 registers with the cutter plate 19 the box is closed and may be readily carried in the pocket. The circular shape facilitates carrying since the box does not have to be turned about to slip into the pocket as does the usual rectangular box. By turning the cover 22 until the blade 20 is exposed (as shown in Figure 1) a fly may be readily cut from the leader by drawing the leader into the cleft 29 so that the fly hangs beneath and when cut off falls into that compartment.

While we have herein set forth a certain preferred embodiment of our invention it is understood that we may vary from the same in minor structural details so as best to provide a practical device for the purposes intended, not departing from the spirit of the invention and within the scope of the appended claims.

We claim:

1. In a device of the kind described, a circular box having a plurality of radial compartments, and a cover rotatably seated on the box, the said cover having an opening through which any of the compartments may be reached by turning the cover on the box, a cutter plate covering one of the said compartments, and a sharpened cutting blade extended out from the cutter plate over an adjacent compartment.

2. In a device of the kind described, a circular box including an annular outer wall, a concentric smaller annular inner wall and a circular bottom, partitions extended radially in spaced relation between the inner and outer walls forming a series of compartments therebetween, a circular cover rotatably mounted over the walls and having an opening through which any of the compartments may be reached by rotating the cover on the box, a cutter plate covering one of the compartments, and a sharpened cutting blade obliquely extended from one margin of the cutter plate.

3. In a device of the kind described, a circular box including an annular outer wall, a concentric smaller annular inner wall and a circular bottom, partitions extended radially in spaced relation between the inner and outer walls forming a series of compartments therebetween, a circular cover rotatably mounted over the walls and having an opening through which any of the compartments may be reached by rotating the cover on the box, the said bottom being set up from the lower margin of the outer wall forming a circular compartment therebeneath, and a spring hinged door mounted to close this compartment.

CLYDE W. PERKINS.
PAUL M. VAN OSTEN.